United States Patent [19]

Hemmings et al.

[11] 3,787,130

[45] Jan. 22, 1974

[54] MOTOR VEHICLE JOINT

[75] Inventors: Keith Reginald Hemmings, Adlington; Gerald Fowler, Eccleston Nr. Chorley, both of England

[73] Assignee: British Leyland Truck and Bus Division Limited, Leyland, Lancashire, England

[22] Filed: Aug. 25, 1971

[21] Appl. No.: 174,772

[30] Foreign Application Priority Data
Aug. 26, 1970 Great Britain.................. 40,975/70
Sept. 16, 1970 Great Britain.................. 44,174/70

[52] U.S. Cl.................. 403/205, 52/665, 52/758 R
[51] Int. Cl............................................. F16b 7/00
[58] Field of Search 287/54 A, 54 B, 54 C, 189.36 C, 287/189.36 D, 189.36 R; 52/726, 731, 665

[56] References Cited
UNITED STATES PATENTS

| 2,843,231 | 7/1958 | Marahn | 287/189.36 R |
| 2,766,855 | 10/1956 | Johnson et al. | 287/189.36 R X |
| 2,737,266 | 3/1956 | Gross | 287/189.36 R X |
| 2,624,427 | 1/1953 | Jacobs | 287/189.36 C X |
| 2,905,285 | 9/1959 | Greulich et al. | 52/726 X |
| 3,312,032 | 4/1967 | Ames | 52/731 X |
| 3,423,890 | 1/1969 | Leigh | 52/731 X |
| 3,469,867 | 9/1969 | Hawes et al. | 287/54 A X |

FOREIGN PATENTS OR APPLICATIONS

| 725,305 | 3/1955 | Great Britain | 287/189.36 C |

Primary Examiner—Jordan Franklin
Assistant Examiner—Wayne L. Shedd
Attorney, Agent, or Firm—Harold T. Stowell et al.

[57] ABSTRACT

An integral construction motor vehicle is provided having a body including first and second frame members to which panel members are attached the frame members being connected by a jointer in the form of a plate which extends between two frame members and is rivetted to them.

7 Claims, 5 Drawing Figures

3,787,130

MOTOR VEHICLE JOINT

FIELD OF INVENTION

The present invention relates to motor vehicles and more particularly to the construction of integral bodies for public service vehicles.

BACKGROUND OF INVENTION

In constructing an integral body for a public service vehicle various members have to be jointed to one another. For example, the roof sticks must be joined to the roof pillars and to the cant rail, and the lower ends of the roof pillars must be jointed to the horizontally extending longitudinal and transverse floor supports. The present invention is concerned with the joints used in these situations.

It has been found that the torsional stiffness of an integral bodied public service vehicle must be sufficiently high to combat excessive distortion at critical locations such as window and door openings, and yet must not be so high as to make the body incapable of absorbing road shocks without fracture.

In the context of the integral construction public service vehicle described in our co-pending UK Patent Application No. 40295/70 considerable research was carried out into the most suitable forms of joints for use in interconnecting roof sticks with roof pillars and cant rails, roof pillars with longitudinally extending side rails, and roof pillars with horizontally extending longitudinal and transverse floor support members. Such member to be jointed are hereinafter referred to as frame members as they constitute a framework to which stress carrying body panels are connected.

It is appreciated that plate joints, per se, are well known and are used extensively in civil engineering construction work. However, the present invention rests on the appreciation that a jointer of the following defined construction is particularly suitable for use in the construction of an integral body public service vehicle as it possesses certain desirable qualities not possessed by other kinds of joint such as welded joints, for example.

SUMMARY OF THE INVENTION

According to the present invention in an integral construction motor vehicle the body includes a first frame member is connected to a second frame member by a jointer which comprises a plate which extends between the two frame members and which is rivetted to them.

According to a first aspect of the invention the plate has at least two arms each arm having flanges extending substantially normal to the plane of the arm so that the arm is channel-shaped in cross-section.

According to a second aspect of the invention the jointer has a projecting top-hat section across its centre, projecting on the opposite side of the jointer to the flanges on each arm, in order to stiffen the jointer.

According to a third aspect of the invention the aforementioned top-hat section has a plurality of apertures in it to provide access to the interior of frame members connected by the jointer.

According to a fifth aspect of the invention the cruciform jointer has apertures through each of its arms by means of which access can be gained to rivets located behind the jointer.

According to a sixth aspect of the invention the plate is T-shaped or cruciform shaped, each of its arms having flanges extending substantially normally to the plane of the arms so that each arm is channel-shaped in cross-section.

According to a seventh aspect of the invention at least one frame member of the vehicle body is of sheet metal having a top-hat cross-section with a closing plate across the flanges of the section the closing plate having a plurality of apertures in it to provide access to the interior of the frame member.

BRIEF DESCRIPTION OF THE DRAWING

How the invention may be carried out will now be described, by way of example only, with reference to the accompanying drawings in which.

DESCRIPTION OF PREFERRED EMBODIMENT

Figure 1:
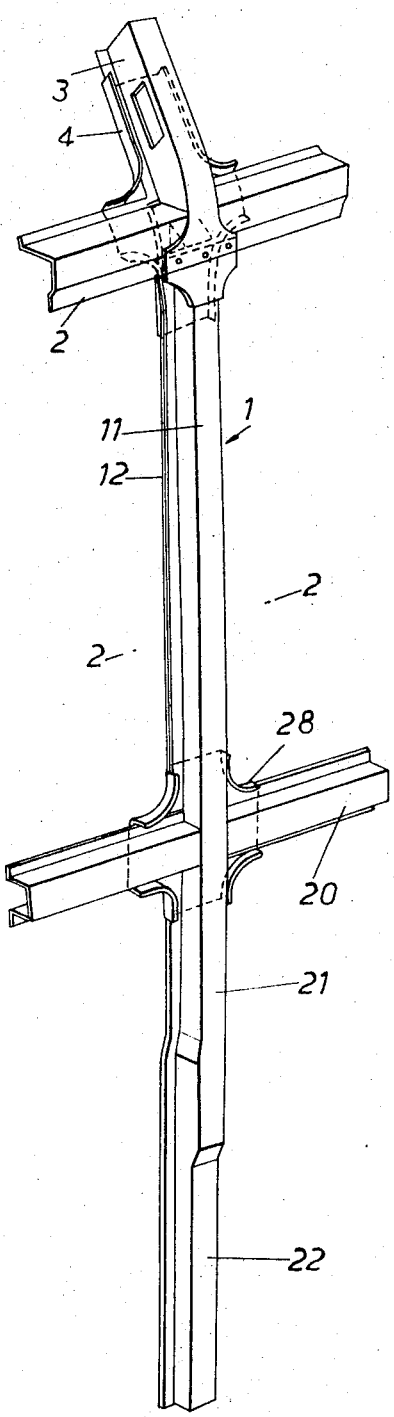
FIG. 1 is a perspective view of a roof pillar of a public service vehicle.
Figure 2:
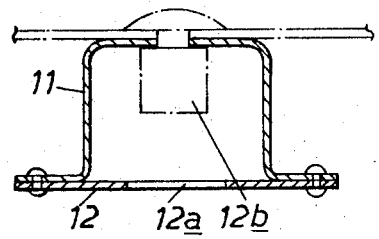
FIG. 2 is a view on section II—II of FIG. 1.

FIGS. 1 and 2 show a roof pillar assembly 1 of sheet metal. The assembly is made up of a "top-hat" section 11 having rivetted to it a closing plate 12. The closing plate 12 has a regular series of access apertures 12a in it to provide access to rivet heads 12b projecting from the inner walls of the section 11. The rivets 12b have the same modular pitch as the apertures 12a one aperture thus providing access to one rivet. Typically the rivets secure the outer panels of the body to the pillar 1 and to cant rail 2, roof stick 3 and window rails 20. The apertures thus allow these rivets to be stripped, by the insertion of an appropriate tool through the aperture, to enable, for example, a damaged outer panel to be removed. In this way the time taken to repair body panel damage is considerably reduced as against conventional forms of construction. The cross-sectional depth of the assembly can be varied in accordance with the design loads on the assembly the upper section 21 of the assembly being of greater cross-sectional depth than the lower section 22.

Figure 3:
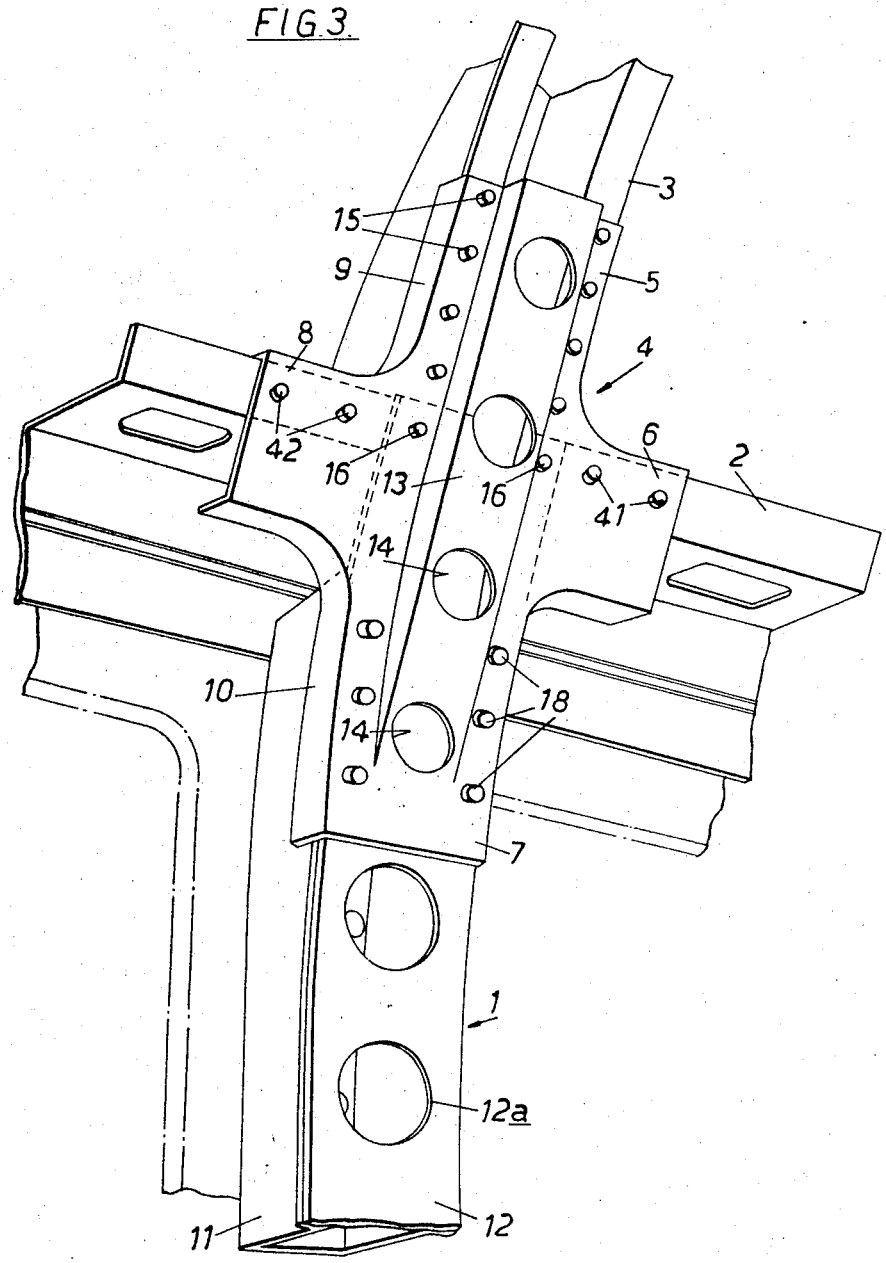
FIG. 3 is a fragmentary perspective view of a first jointer connecting the roof pillar of FIGS. 1 and 2 to a roof stick and cant rail.
Figure 4:
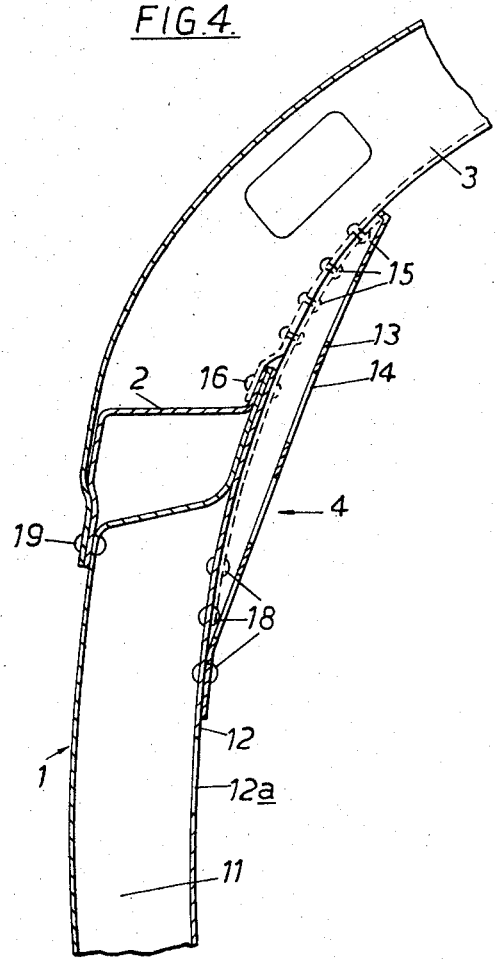
FIG. 4 is a sectional view along the vertical centre line of the jointer shown in FIG. 3.
Figure 5:
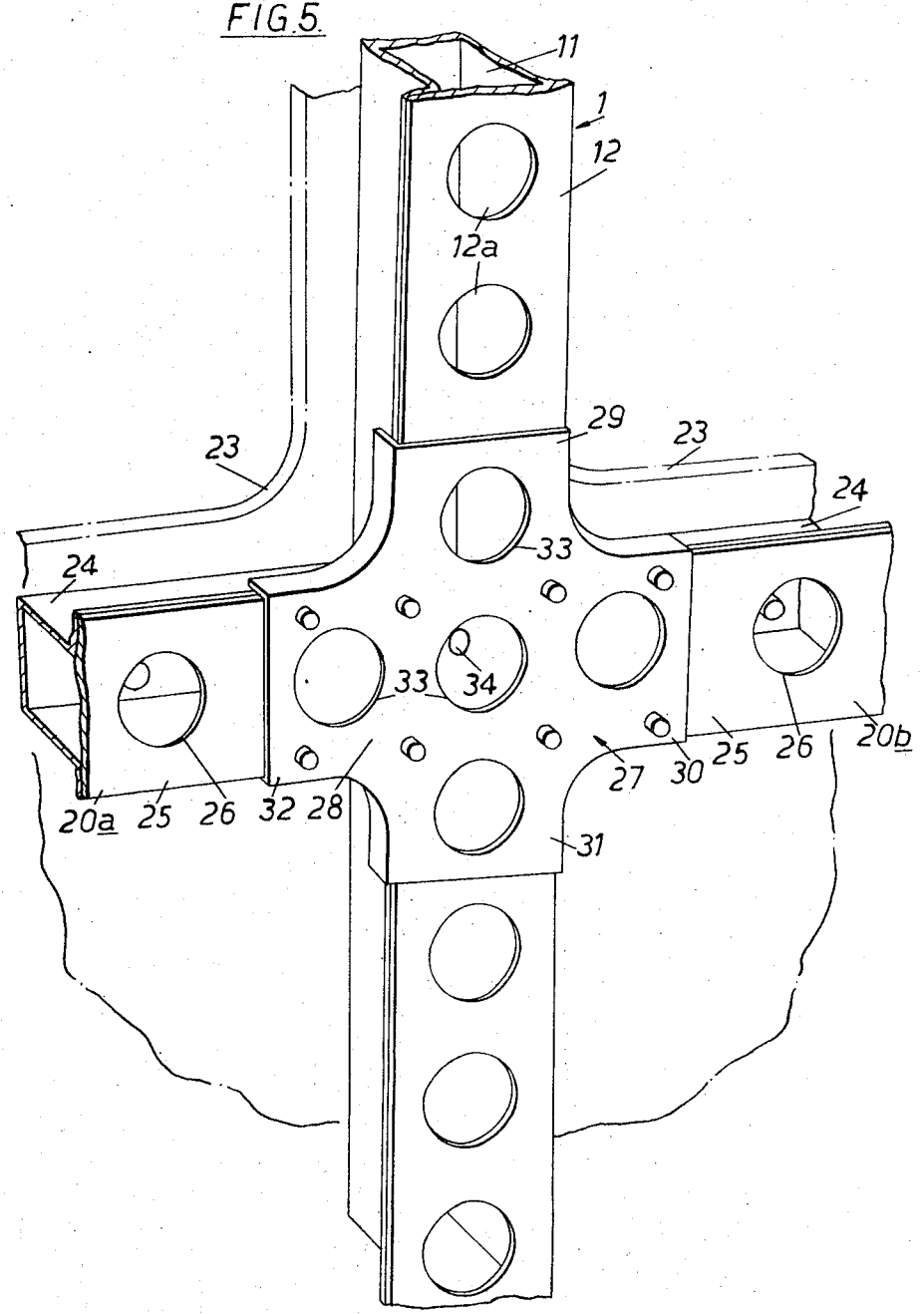
FIG. 5 is a fragmentary perspective view of a second jointer.

FIGS. 3, 4 and 5 disclose jointer means for connecting the frame members. Jointer 4 comprises a metal plate which is of cruciform configuration having four arms 5, 6, 7 and 8. Each of these arms has flanges which extend substantially normally to the plane of the arm in order to reinforce it. Each arm is thus channel-shaped in cross-section. Flanges on adjacent arms run into one another as indicated by flanges 9, 10 in FIG. 3.

The jointer 4 is curved in a vertical direction in order to conform to the shape of the roof stick 3. A projecting integral top-hat section 13 extends across the centre of the plate from the arm 5 to the arm 7 and has apertures 14 in it to allow access to rivets located behind the jointer.

Rivets 15 pass through the arm 5 and the roof stick 3 (FIG. 4) to secure the jointer 4 to the roof stick. Rivets 16 pass through the arm 5, the top of the pillar 11 and the roof stick 3 to join the roof stick to the pillar 11 and both to the jointer 4. Rivets 18 secure the arm 7 to the pillar 1. The lowermost end of the roof stick 3 is also secured to the top of the pillar 11 by rivets 19. Rivets 41, 42 respectively secure arms 6, 7 to cant rail 2.

The roof pillars 1 are interconnected by a discontinuous window rail 20 which passes below the vehicle's window openings 23 and comprises a top-hat section 24, closed by a flat plate 25 which has apertures 26 in it.

A jointer 27 interconnects the pillar 1 and the ends 20a, b of the rail 20. The jointer 28 comprises a metal plate of cruciform shape having four arms 29, 30, 31 and 32 each of which has the flanged sides, similar to the jointer of FIG. 3, to strengthen it. The plate also has apertures 33 which are in register with apertures in the top-plate 12 of pillar 1 and apertures in the side rail 20 to allow access to rivets (for example rivet 34) are located behind the jointer 28 and which secure the outer panels of the body to the pillar 1 and to the rail 20. As in the case of apertures 12a in the roof pillar apertures 33 in plate allow rivets to be "stripped," by the insertion of an appropriate tool through the associated aperture, for example to enable a damaged outer panel to be removed and replaced.

In the above embodiment four-armed cruciform-shaped jointers are shown with adjacent arms at right angles. However the invention does not exclude other numbers of arms or their disposition. Thus two, as well as three armed joints, of T form, can be used or joints with five or more arms. The angles between adjacent arms can differ from a right angle and arms can be offset in the sense that their longitudinal axes are parallel but not in line.

We claim:

1. A joint for a motor vehicle body integral construction including first and second crossed, elongated frame members, said frame members adapted to carry panel members, a sheet metal jointer having arms, said arms secured to and connecting the two said frame members, said jointer comprising a plate which extends across the two frame members, at least one of said frame members being made of sheet metal and having flanges on its edges and having a top-hat cross section, and a closing plate secured across the said flanges of the said frame member, said closing plate having a plurality of longitudinally spaced apertures in it to provide access to the interior of the said first frame member, at least one of said frame members being cooperatively received by flanges on the edges of said jointer.

2. A joint as claimed 1 in which each arm of the jointer has longitudinally spaced apertures in it to provide access to the interior of the frame member.

3. A joint as claimed in claim 2 in which at least some of the said apertures are of similar size to each other and are spaced at a uniform pitch distance from one another.

4. A joint for a motor vehicle body integral construction including first and second crossed elongated frame members to which panel members are adapted to be attached, a jointer connecting the two said frame members, said jointer comprising a plate which extends across the two frame members, rivets joining the jointer to the said two frame members, the jointer having at least two generally planar arms, each arm having flanges extending substantially normal to the plane of the arm so that each said arm is channel-shaped in cross section, at least one of said frame members being cooperatively received by said flanges, the jointer also having a projecting, elongated top-hat section extending across its center and projecting from the jointer on the opposite side of the flanges on each arm, in order to stiffen the jointer.

5. A joint as claimed in claim 4 in which the top-hat section of the jointer has a plurality of longitudinally spaced apertures in it to provide access to the interior of frame members connected by the jointer.

6. A joint as claimed in claim 4 in which at least some of the said apertures are of similar size to each other and are spaced at a uniform pitch distance from one another.

7. The joint of claim 4, including, a closing plate secured across the flanges of at least that frame member which is cooperatively received by said flanges on said jointer, said closing plate having a plurality of longitudinally spaced apertures in it to provide access to the interior of the said first frame member.

* * * * *